: US 10,747,934 B2

(12) United States Patent
Lind et al.

(10) Patent No.: US 10,747,934 B2
(45) Date of Patent: Aug. 18, 2020

(54) MANAGING FEEDTHROUGH WIRING FOR INTEGRATED CIRCUITS

(71) Applicant: International Business Machines Corporation, Armonk, NY (US)

(72) Inventors: Kurt Lind, Tuebingen (DE); Lukas Dällenbach, Altdorf (DE); Friedrich Schröder, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 16/200,885

(22) Filed: Nov. 27, 2018

(65) Prior Publication Data
US 2020/0167441 A1  May 28, 2020

(51) Int. Cl.
| | | |
|---|---|---|
| *G06F 30/394* | (2020.01) | |
| *G06F 30/398* | (2020.01) | |
| *G06F 111/04* | (2020.01) | |
| *G06F 111/20* | (2020.01) | |

(52) U.S. Cl.
CPC .......... *G06F 30/394* (2020.01); *G06F 30/398* (2020.01); *G06F 2111/04* (2020.01); *G06F 2111/20* (2020.01)

(58) Field of Classification Search
USPC ...................................................... 716/112
See application file for complete search history.

(56) References Cited

U.S. PATENT DOCUMENTS

| | | | |
|---|---|---|---|
| 6,567,967 B2 | 5/2003 | Greidinger et al. | |
| 8,455,994 B2 | 6/2013 | Iihola et al. | |
| 9,201,999 B1 | 12/2015 | Sahni | |
| 9,293,450 B2 | 3/2016 | Maziasz | |
| 9,697,317 B1 | 7/2017 | Qian | |
| 2006/0294485 A1* | 12/2006 | Kaul | G06F 30/394 716/113 |
| 2012/0198408 A1* | 8/2012 | Chopra | G06F 30/3323 716/127 |
| 2016/0191058 A1 | 6/2016 | Bisht et al. | |

FOREIGN PATENT DOCUMENTS

CN     102467582 B     8/2014

OTHER PUBLICATIONS

Xu et al.; "A Case Study: Applying Semi-Custom Design Flow to Address Routing Challenge"; sourcedb.ict.cas.cn/cn/ictthesis/201103/P020110313588141569735; 6 Pages.

* cited by examiner

*Primary Examiner* — Bryce M Aisaka
(74) *Attorney, Agent, or Firm* — Cantor Colburn LLP; Margaret McNamara

(57) ABSTRACT

Managing feedthrough wiring for an integrated circuit via design data is provided. The integrated circuit includes a sub-unit, which further includes a feedthrough wire that forwards a digital signal from an input of the sub-unit to an output of the sub-unit. The design data describes the feedthrough wiring of the sub-unit. Management of the feedthrough wiring includes determining physical constraint data from parameter data of the feedthrough wire and timing constraint data related to the feedthrough wire from the physical constraint data. The design data is then synthesized based on the timing constraint data.

20 Claims, 6 Drawing Sheets

MANAGING FEEDTHROUGH WIRING FOR INTEGRATED CIRCUITS

BACKGROUND

The disclosure relates generally to feedthrough wiring, and more specifically, to managing feedthrough wiring for integrated circuits.

Conventionally, development of a processor requires using a hierarchical approach and in consequence sharing wire resources between these levels. Larger low-hierarchy level circuits (sub-units) need access to the expensive high metal layers to support the processor frequency. But the top hierarchy also needs to route connections through the large area of the low-level circuits. The connections are made by sharing by wire tracks or regions. Yet, wire track sharing has a noise impact on the processor circuitry, and sharing wire resources by regions is cumbersome and hard to manage when designing the processor. Further, both of these sharing variants require buffer bays on each ~500 µm distance. At present, a more elegant means is needed to overcome the concerns of conventional sharing variants.

SUMMARY

According to one or more embodiments, managing feedthrough wiring for an integrated circuit via design data is provided. The integrated circuit includes a sub-unit, which further includes a feedthrough wire that forwards a digital signal from an input of the sub-unit to an output of the sub-unit. The design data describes the feedthrough wiring of the sub-unit. Management of the feedthrough wiring includes determining physical constraint data from parameter data of the feedthrough wire and timing constraint data related to the feedthrough wire from the physical constraint data. The design data is then synthesized based on the timing constraint data.

According to one or more embodiments, the Management of the feedthrough wiring can be implemented by a system, as a computer-implemented method, and/or via a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
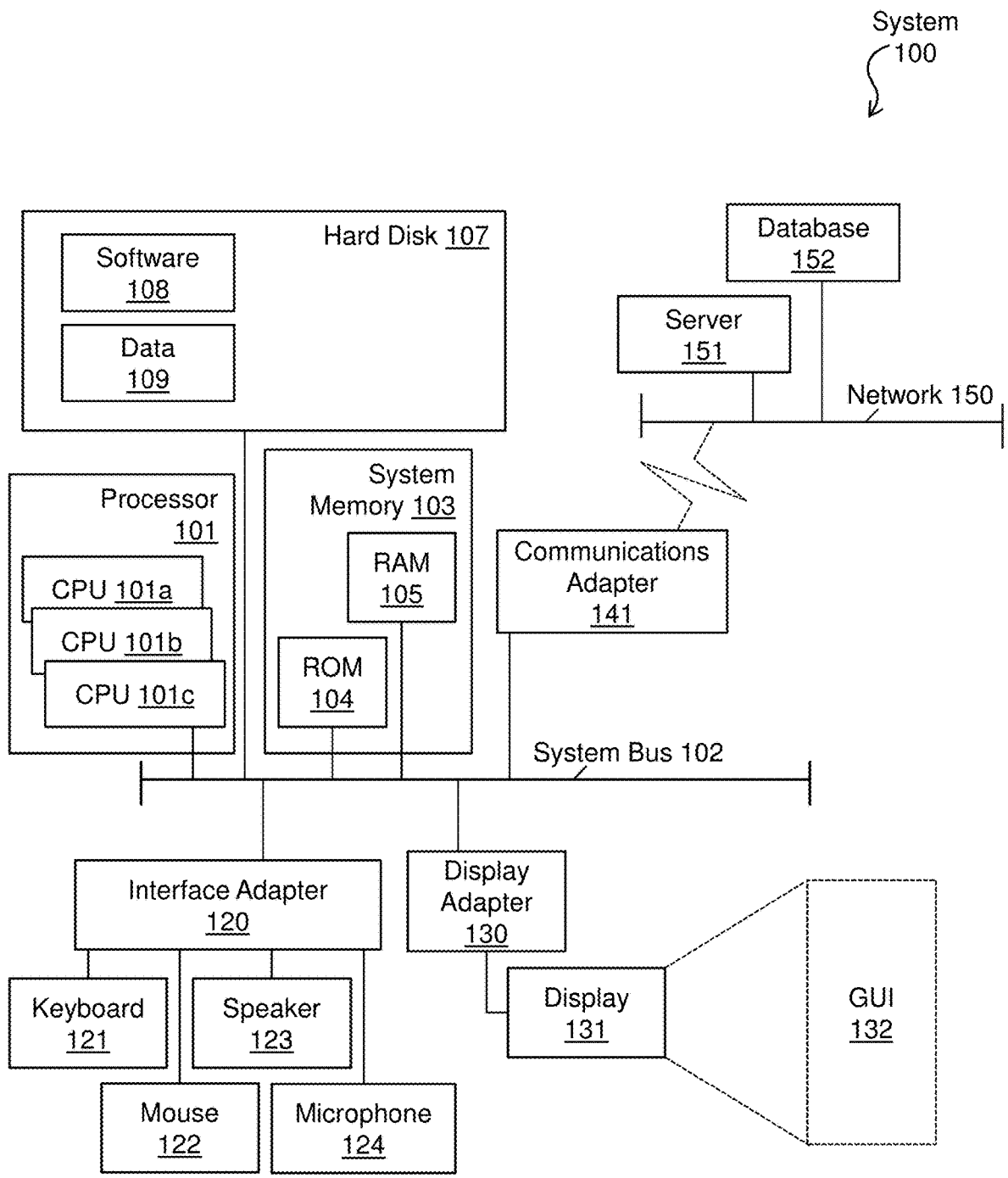
FIG. 1 depicts a processing system in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, processor development requires connecting resources, and conventional sharing variants provide concerns with respect to noise and management. For instance, one method of processor development includes hierarchical physical implementation of digital integrated circuits involves partitioning a full netlist of an integrated circuit into partitions (e.g., modules) location on a 'lower' hierarchical level of the integrated circuit. Fixed physical boundaries are assigned to each partition, which is constrained to instances (e.g., cells) and nets (e.g., wires) that belong to that partition's netlist (e.g., only cells and nets specific to that partition can be placed and routed inside that partition's boundary). While these individual partitions are designed, there is a separate need to connect resources of a 'top' metal layer to the partitions and the challenge is to make a logical design of the integrated circuit that can be implemented properly in the physical design of the integrated circuit. For example, the logical design needs to be translated into proper port connections between abutting partitions (note that there are many port connections that need to be coordinated correctly). Conventional sharing variants provide concerns attempt to address this need and solve this challenge; however, conventional sharing variants are tedious, time-consuming, costly, and provide the concerns noted herein with respect to noise and management.

Turning now to an overview of the aspects of the invention, one or more embodiments of the invention address the above-described shortcomings of the prior art by conventional sharing variants. Embodiments of managing feedthrough wiring for integrated circuits may include system, method, and/or computer program product (herein system) that evenly distributes resource consumption caused by a feedthrough net of an integrated circuit. Resource consumption is the utilization of the 'top' metal layer by macros (e.g., components and/or cells of the integrated circuit) of the 'lower' hierarchical level. Feedthrough wiring (also referred to as feedthroughs) are the wires that connect portions of the top level hierarchy through the feedthrough macros. Feedthrough macros, in general, are macros containing feedthroughs, respectively, feedthrough wiring. Herein, embodiments of the feedthrough macros overcome the concerns of conventional sharing variants by enabling each macro to be connected to all needed resources. For example, for the feedthrough macros, the system determines the same wire quality for both integration sections (the top hierarchy level) and inside the feedthrough macro, detects paths that require a better wire quality (e.g., net constraints) than available, and create assertions (e.g., timing constraints) for the feedthrough macros.

Turning now to FIG. 1, a system 100 is generally shown in accordance with an embodiment. The system 100 is utilized to implement processes for managing feedthrough wiring for integrated circuits, such as the process flows of FIGS. 3-6.

The system 100 can be an electronic, computer framework including and/or employing any number and combination of computing devices and networks utilizing various communication technologies, as described herein. The system 100 can be easily scalable, extensible, and modular, with the ability to change to different services or reconfigure some features independently of others.

The system 100 has a processor 101, which can include one or more central processing units (CPUs) 101a, 101b, 101c, etc. The processor 101, also referred to as a processing circuit, microprocessor, computing unit, is coupled via a system bus 102 to a system memory 103 and various other components. The system memory 103 includes read only memory (ROM) 104 and random access memory (RAM) 105. The ROM 104 is coupled to the system bus 102 and may include a basic input/output system (BIOS), which controls certain basic functions of the system 100. The RAM is read-write memory coupled to the system bus 102 for use by the processor 101.

The system 100 of FIG. 1 includes a hard disk 107, which is an example of a tangible storage medium readable executable by the processor 101. The hard disk 107 stores software 108 and data 109. The software 108 is stored as instructions for execution on the system 100 by the processor 101 (to perform processes, such as the process flows of FIGS. 3-6). The data 109 includes a set of values of qualitative or quantitative variables organized in various data structures to support and be used by operations of the software 108. According to one or more embodiments, the data 109 includes iteration of design data and one or more tables described herein.

The system 100 of FIG. 1 includes one or more adapters (e.g., hard disk controllers, network adapters, graphics adapters, etc.) that interconnect and support communications between the processor 101, the system memory 103, the hard disk 107, and other components of the system 100 (e.g., peripheral and external devices). In one or more embodiments of the present invention, the one or more adapters can be connected to one or more I/O buses that are connected to the system bus 102 via an intermediate bus bridge, and the one or more I/O buses can utilize common protocols, such as the Peripheral Component Interconnect (PCI).

As shown, the system 100 includes an interface adapter 120 interconnecting a keyboard 121, a mouse 122, a speaker 123, and a microphone 124 to the system bus 102. The system 100 includes a display adapter 130 interconnecting the system bus 102 to a display 131. The display adapter 130 (and/or the processor 101) can include a graphics controller to provide graphics performance, such as a display and management of a graphical user interface 132. A communications adapter 141 interconnects the system bus 102 with a network 150 enabling the system 100 to communicate with other systems, devices, data, and software, such as a server 151 and a database 152. In one or more embodiments of the present invention, the operations of the software 108 and the data 109 can be implemented on the network 150 by the server 151 and the database 152. For instance, the network 150, the server 151, and the database 152 can combine to provide internal iterations of the software 108 and the data 109 as a platform as a service, a software as a service, and/or infrastructure as a service (e.g., as a web application in a distributed system).

Thus, as configured in FIG. 1, the operations of the software 108 and the data 109 (e.g., the system 100) are necessarily rooted in the computational ability of the processor 101 and/or the server 151 to overcome and address the herein-described shortcomings of the conventional sharing variants. In this regard, the software 108 and the data 109 improve computational operations of the processor 101 and/or the server 151 of the system 100 and improve a design quality of integrated circuits (outputted by the processor 101 and/or the server 151 of the system 100) by managing feedthrough wiring for the integrated circuits with respect to connecting resources and making logical designs (thereby also eliminating the tedious, time-consuming, costly, noise, and management concerns of the conventional sharing variants).

Figure 2:
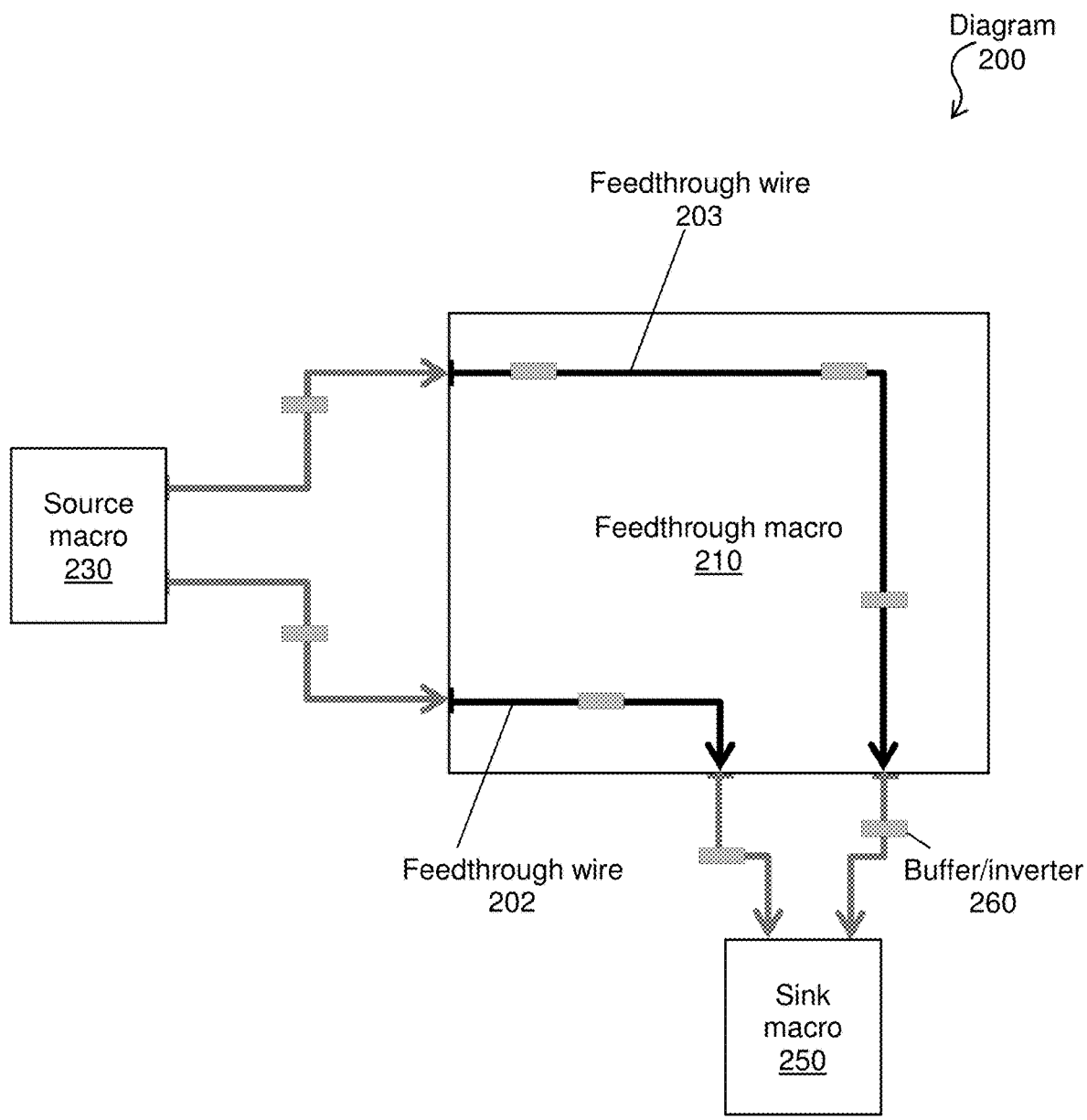
FIG. 2 depicts a diagram in accordance with one or more embodiments.

Turning now to FIG. 2, a diagram 200 in accordance with one or more embodiments is depicted. The diagram 200 is an example of design data (produced by software 108 and the data 109 of FIG. 1) for managing feedthrough wiring for an integrated circuit. In general, the integrated circuit includes a sub-unit including one or more feedthrough wires 202, 203. This sub-unit may be referred to as a feedthrough macro 210. The feedthrough macro 210 forwards a digital signal from an input of the sub-unit to an output of the sub-unit. The input of the sub-unit can be connected to a source macro 230. The output of the sub-unit can be connected to a sink macro 230. One or more buffers/invertors 260 can be positioned through the diagram 200. Thus, the diagram 200 describes the feedthrough wiring of the feedthrough macro 210.

In accordance with one or more embodiments, the system 100 of FIG. 1 measures a total net distance from the source macro 230 to the sink macro 250 and determines a minimum net constraint (e.g., wire quality) to support a given cycle time. The system 100 of FIG. 1 feeds this net constraint back to integration and creates timing constraints (e.g., assertions) for the feedthrough macro 210, which indirectly demand the same net constraint from macro synthesis.

In addition, the system 100 of FIG. 1 supports for logic contained in feedthrough paths, limits maximum net constraints in the feedthrough macro 210 (e.g., prevents choking synthesis), and issue warnings when only expensive or no matching net constraints are available. Technical effects and benefits of the system 100 of FIG. 1 include a management of a wire quality over three wiring areas in a hierarchical design: a first integration space including the source macro 230 to the feedthrough macro 210, a synthesis space including inside the feedthrough macro 210, and a second integration space including the feedthrough macro 210 to the sink macro 250.

Figure 3:
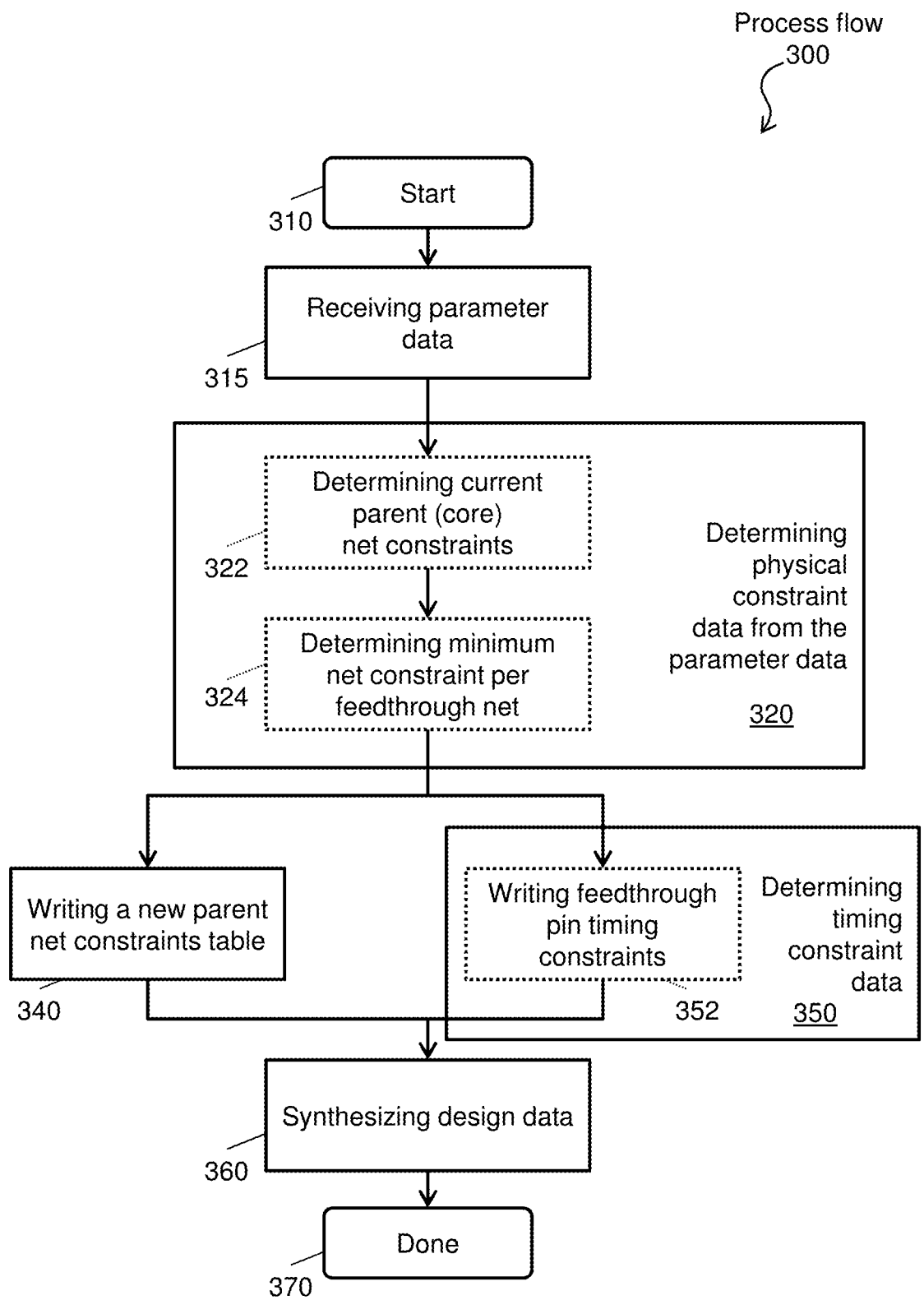
FIG. 3 depicts a process flow in accordance with one or more embodiments.

FIG. 3 depicts a process flow 300 in accordance with one or more embodiments. The process flow 300 is an example of a method for managing feedthrough wiring for an integrated circuit via design data. The process flow 300 is described with respect to the system 100 of FIG. 1 and the diagram 200 of FIG. 2.

The process flow 300 begins at block 310 and proceeds to block 315, where the system 100 receives parameter data describing at least one parameter of a net associated with one of the feedthrough wires 202, 203.

At block 320, the processor 101 based on the software 108 determines physical constraint data from the parameter data of the feedthrough wire 202, 203. The physical constraint data describes minimum requirements concerning a physical structure of the feedthrough wire 202, 203, such as current parent net constraints and minimum net constraint per feedthrough net. Further, determining the physical constraint data can be based on a required cycle time and a cycle reach table (e.g., stored as data 109). The cycle reach table can include a delay per length unit of a wire having specific physical properties. The operation of block 320 can be further described with respect to blocks 322 and 324.

Figure 4:
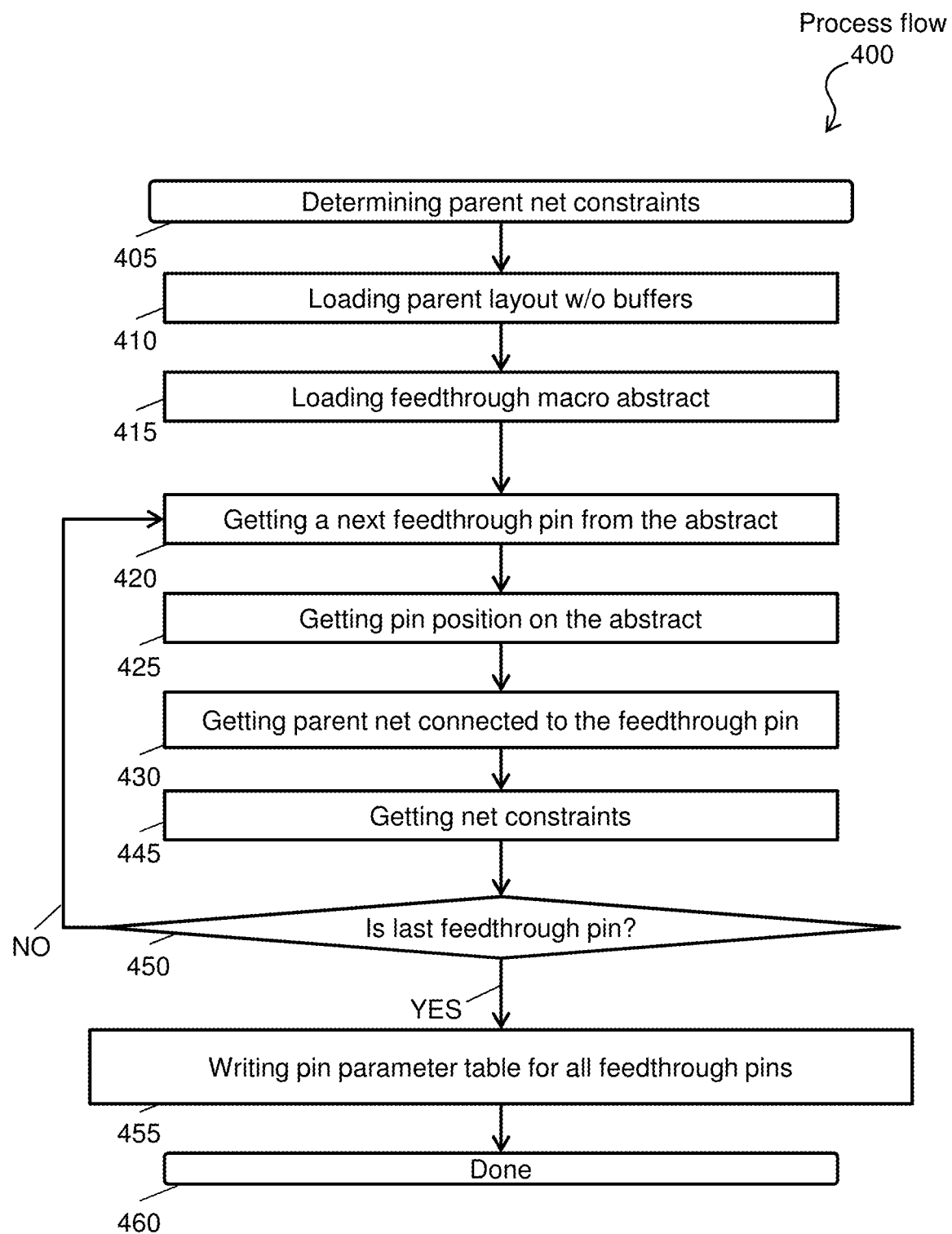
FIG. 4 depicts a process flow in accordance with one or more embodiments.

At block 322, the processor 101 determines a current parent net constraints of the integrated circuit (note that block 322 is further described with respect to FIG. 4). At block 324, the processor 101 determines a minimum net constraint per feedthrough net of the integrated circuit. In accordance with one or more embodiments, the processor 101 can also determine at least one of a total length of a net associated with the feedthrough wire 202, 203, a logic penalty caused by logic circuitry inserted into the feedthrough wire 202, 203, and latch delay caused by a latch connected to the net.

At block 340, the system 100 writes a new parent net constraints table. Note that the system 100 can also determine minimum net constraints for integration level wires and, thus, manage wire quality on a top level. At block 350, the processor 101 determines timing constraint data related to the feedthrough wire 202, 203 from the physical constraint data (of block 320). The operation of block 350 can be further described with respect to block 352. At block 352, the system 100 writes feedthrough pin timing constraints for the integrated circuit into the design data. In accordance with one or more embodiments, the processor 101 can determine the timing constraint data based on estimating a length of the feedthrough wire 202, 203 together with looking up the cycle reach table. Note that for each feedthrough pin pair, the system 100 acquires parent (core) net names from a feedthrough parameter table (e.g., stored as data 109) and/or net constraints from pin pair and new net constraint table (e.g., also stored as data 109; and as described with respect to FIG. 6).

At block 360, the processor 101 synthesizes the design data based on the timing constraint data. The is, the processor 101 combines the timing constraint data with respect to the source macro 230 and the sink macro 250 to determine to the input, inside and output of feedthrough macro 210. In accordance with one or more embodiments, the integrated circuit can include at least one integration wire for interconnecting the input or output of the sub-unit to a further sub-unit of the integrated circuit. In this case, the system 100 generates additional design data related to the at least one integration wire based on the physical constraint data.

At block 370, the process flow 300 concludes. In accordance with one or more embodiments, the design data can be implemented in a manufacturing process to produce the integrated circuit. For example, the system 100 can provide the design data, as an input, to a manufacturing process that physically builds the integrated circuit.

FIG. 4 depicts a process flow 400 in accordance with one or more embodiments. The process flow 400 is described with respect to the system 100 of FIG. 1 and the diagram 200 of FIG. 2 and is an example of determining a current parent net constraints of an integrated circuit as shown by block 322 of FIG. 3.

The process flow 400 at block 405, where the system 100 determines parent net constraints. At block 410, the system 100 loads the parent layout without buffers (e.g., this loading can be a layout view that contains macros, but no buffers). At block 415, the system 100 loads a feedthrough macro abstract. At block 420, the system 100 gets or acquires a next feedthrough pin from the feedthrough macro abstract. At block 425, the system 100 gets or acquires a pin position from the feedthrough macro abstract. At block 430, the system 100 gets or acquires the parent net connected to the feedthrough pin. At block 445, the system 100 gets or acquires the corresponding parent net constraints. Examples of net constraints include, but are not limited to, a wire code, a use layer, and a minimum Steiner length.

At decision block 450, the system 100 determines if the feedthrough pin is the last feedthrough pin. If there are additional feedthrough pins, the process flow 400 returns to block 420 (as shown by the NO arrow). If there are no additional feedthrough pins, the process flow 400 proceeds to block 455 (as shown by the YES arrow). At block 455, the system 100 writes a pin parameter table for all of the feedthrough pins. The pin parameter table includes, but is not limited to, a pin name, a pin position, a net name, a net length, a net wire code, and a use layer for all feedthrough pins. At block 460, the process flow 400 concludes.

Figure 5:
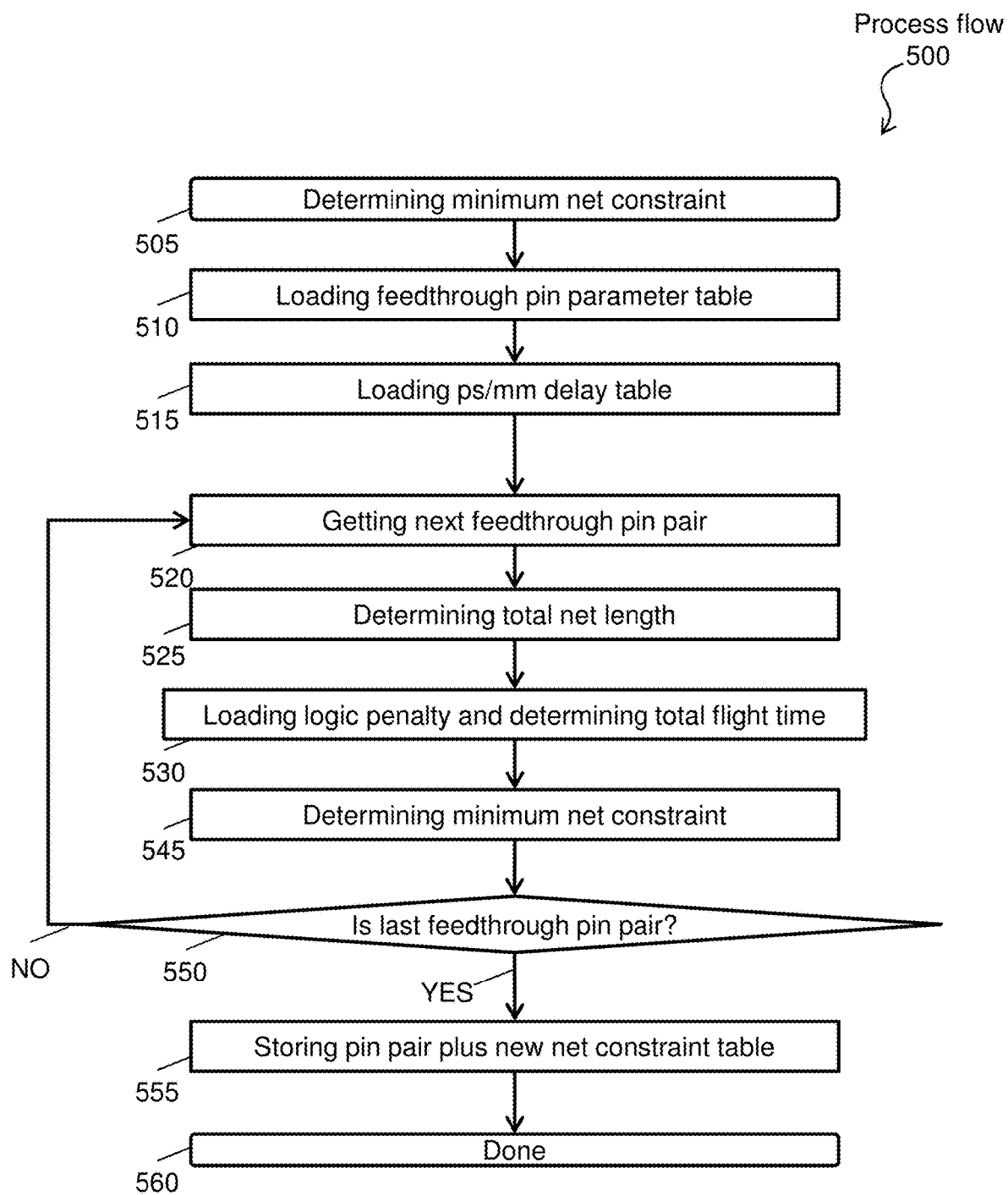
FIG. 5 depicts a process flow in accordance with one or more embodiments.

FIG. 5 depicts a process flow 500 in accordance with one or more embodiments. The process flow 500 is described with respect to the system 100 of FIG. 1 and the diagram 200 of FIG. 2 and is an example of determining a current parent net constraints of an integrated circuit as shown by block 324 of FIG. 3.

The process flow 500 at block 505, where the system 100 determines minimum net constraint. At block 510, the system 100 loads feedthrough pin parameter table (e.g., the pin parameter table for all feedthrough pins resulting from block 455). At block 515, the system 100 loads delay table (e.g., stored as data 109), which includes a delay entry for each net constraint that can contain values in picoseconds per millimeter (ps/mm). At block 520, the system 100 gets a next feedthrough pin (such as from the feedthrough macro abstract). At block 525, the system 100 determines a total net length. The total net length can include a distance between pins in the feedthrough macro 210 plus a parent net length before feedthrough plus a parent net length after feedthrough.

At block 530, the system 100 loads a logic penalty (from a file with logic penalties per feedthrough pin pair in the data 109) and determines a total flight time. The total flight time can be a duty cycle time minus the logic penalty. The duty cycle time can be a cycle time plus a sink latch clock delay minus source launch time.

At block 545, the system 100 determines minimum net constraint. The minimum net constraint is a minimum wire quality that satisfies a determined total flight time over the determined total net length. In accordance with one or more embodiments, the system 100 can generate a warning if the net constraint is too expensive or the best net constraint is still insufficient (e.g., generate warnings in case a resulting net constraints are not implementable). Further, the system 100 can generate a warning if current parent net constraint is insufficient.

At decision block 550, the system 100 determines if the feedthrough pin is the last. If there are additional feedthrough pins, the process flow 500 returns to block 520 (as shown by the NO arrow). If there are no additional feedthrough pins, the process flows 500 proceeds to block 555 (as shown by the YES arrow). At block 555, the system 100 stores a pin pair plus new net constraint table (e.g., stored as data 109). At block 560, the process flow 500 concludes.

Figure 6:
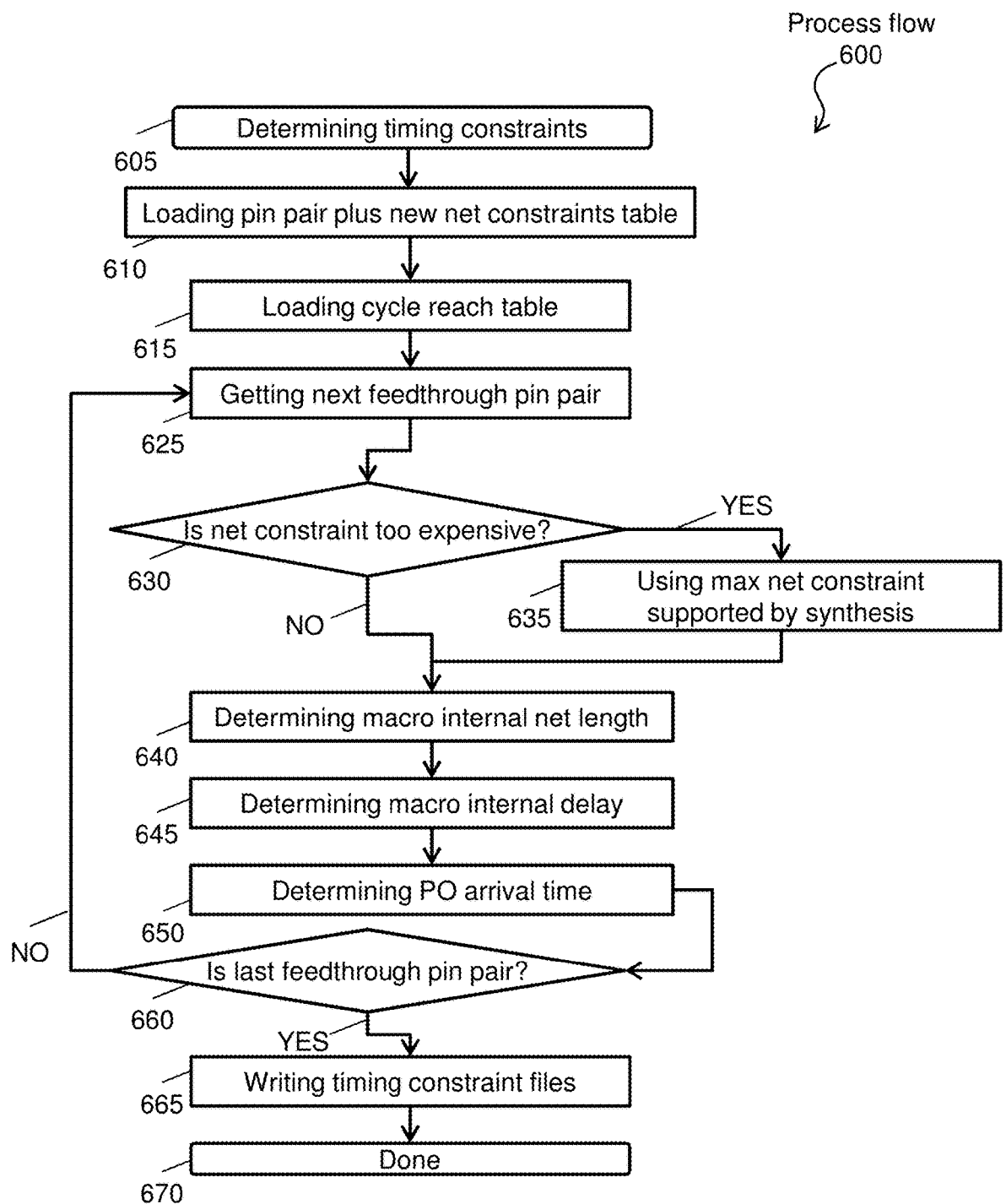
FIG. 6 depicts a process flow in accordance with one or more embodiments.

FIG. 6 depicts a process flow 600 in accordance with one or more embodiments. The process flow 600 is described with respect to the system 100 of FIG. 1 and the diagram 200 of FIG. 2 and is an example of determining a current parent net constraints of an integrated circuit as shown by block 360 of FIG. 3.

The process flow 600 at block 605, where the system 100 determines timing constraints. At block 610, the system 100 loads a pin pair plus new net constraints table (e.g., from block 555 of FIG. 5). At block 615, the system 100 loads a cycle reach table (also known as a ps/mm net table), which can also include a ps/mm delay entry for each net constraint. At block 625, the system 100 gets a next feedthrough pin (such as from the feedthrough macro abstract).

At decision block 630, the system 100 determines whether the net constraint is too expensive. By determining whether the net constraint is too expensive, the system 100 protects the feedthrough macro synthesis from timing constraints, which are too hard, and demands net constraints that are not implementable by synthesis. If the net constraint is too expensive, the process flow 600 proceeds to block 635 (as shown by the YES arrow). At block 635, the system 100 uses a maximum net constraint supported by synthesis. Then, the process flow 600 proceeds to block 640. If the net constraint not is too expensive, the process flow 600 utilizes that net constraint and proceeds to block 640 (as shown by the NO arrow).

At block 640, the system 100 determines macro internal net length. The macro internal net length can be a distance between pin pair in the feedthrough macro 210. At block 645, the system 100 determines macro internal delay. The macro internal delay can be based on pin pair net constraint and a corresponding ps/mm value. At block 650, the system 100 determines PO arrival time. A PI arrival time can be a fixed value, e.g., 100. A PO arrival time can be a PI arrival time plus macro internal delay.

At decision block 660, the system 100 determines if the feedthrough pin is the last. If there are additional feedthrough pins, the process flow 600 returns to block 625 (as shown by the NO arrow). If there are no additional feedthrough pins, the process flow 600 proceeds to block 665 (as shown by the YES arrow). At block 665, the system 100 writes timing constraint files (e.g., into the data 109). The timing constraint files can include PI and PO arrival times (from block 650), PO loads from another table (based on a net constraint for a feedthrough pin), and other timing constraint values from project defaults. At block 670, the process flow 500 concludes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing feedthrough wiring for an integrated circuit via design data, the integrated circuit comprising a sub-unit including a feedthrough wire for forwarding a digital signal from an input of the sub-unit to an output of the sub-unit, the design data describing the feedthrough wiring of the sub-unit, the computer-implemented method comprising:
    determining, by a processor of a computer, physical constraint data from parameter data of the feedthrough wire;
    determining, by the processor, timing constraint data related to the feedthrough wire from the physical constraint data;
    determining, by the processor, an expense of a net constraint of the feedthrough wire and utilizing a maximum net constraint supported by synthesis or the net constraint; and
    synthesizing, by the processor, the design data based on the timing constraint data.

2. The computer-implemented method of claim 1, wherein the computer-implemented method further comprises:
    generating a warning when a net constraint of the feedthrough wire is not implementable.

3. The computer-implemented method of claim 1, wherein determining the physical constraint data comprises:
   determining current parent net constraints of the integrated circuit; and
   determining a minimum net constraint per feedthrough net of the integrated circuit.

4. The computer-implemented method of claim 1, wherein the physical constraint data comprises minimum requirements concerning a physical structure of the feedthrough wire.

5. The computer-implemented method of claim 1, wherein determining the physical constraint data is based on a required cycle time and a cycle reach table, the cycle reach table comprising a delay per length unit of a wire having specific physical properties.

6. The computer-implemented method of claim 1, wherein determining the physical constraint data comprises:
   determining at least one of a total length of a net associated with the feedthrough wire, a logic penalty caused by logic circuitry inserted into the feedthrough wire, and latch delay caused by a latch connected to the net.

7. The computer-implemented method of claim 1, wherein determining the timing constraint data comprises:
   writing feedthrough pin timing constraints for the integrated circuit into the design data.

8. The computer-implemented method of claim 1, wherein determining the timing constraint data is based on estimating a length of the feedthrough wire and comprises looking up a cycle reach table.

9. The computer-implemented method of claim 8, wherein the computer-implemented method further comprises:
   generating additional design data related to the at least one integration wire based on the physical constraint data.

10. The computer-implemented method of claim 8, wherein the computer-implemented method further comprises:
    determining a minimum net constraints for integration level wires; and managing a wire quality on a top level.

11. The computer-implemented method of claim 1, wherein the integrated circuit comprises at least one integration wire for interconnecting the input or output of the sub-unit to a further sub-unit of the integrated circuit.

12. A computer program product for managing feedthrough wiring for an integrated circuit via design data, the integrated circuit comprising a sub-unit including a feedthrough wire for forwarding a digital signal from an input of the sub-unit to an output of the sub-unit, the design data describing the feedthrough wiring of the sub-unit, the computer program product comprising a computer readable storage medium having program instructions embodied therewith, the program instructions executable by a processor to cause:
   determining physical constraint data from parameter data of the feedthrough wire;
   determining timing constraint data related to the feedthrough wire from the physical constraint data;
   determining an expense of a net constraint of the feedthrough wire and utilizing a maximum net constraint supported by synthesis or the net constraint; and
   synthesizing the design data based on the timing constraint data.

13. The computer program product of claim 12, wherein the program instructions are further executable by the processor to cause:
    generating a warning when a net constraint of the feedthrough wire is not implementable.

14. The computer program product of claim 12, wherein determining the physical constraint data comprises:
    determining current parent net constraints of the integrated circuit; and
    determining a minimum net constraint per feedthrough net of the integrated circuit.

15. The computer program product of claim 12, wherein the physical constraint data comprises minimum requirements concerning a physical structure of the feedthrough wire.

16. The computer program product of claim 12, wherein determining the physical constraint data is based on a required cycle time and a cycle reach table, the cycle reach table comprising a delay per length unit of a wire having specific physical properties.

17. The computer program product of claim 12, wherein determining the physical constraint data comprises:
    determining at least one of a total length of a net associated with the feedthrough wire, a logic penalty caused by logic circuitry inserted into the feedthrough wire, and latch delay caused by a latch connected to the net.

18. The computer program product of claim 12, wherein the physical constraint data comprises minimum requirements concerning a physical structure of the feedthrough wire.

19. The computer program product of claim 12, wherein the integrated circuit comprises at least one integration wire for interconnecting the input or output of the sub-unit to a further sub-unit of the integrated circuit.

20. A system comprising a processor and a memory storing program instructions for managing feedthrough wiring for an integrated circuit via design data, the integrated circuit comprising a sub-unit including a feedthrough wire for forwarding a digital signal from an input of the sub-unit to an output of the sub-unit, the design data describing the feedthrough wiring of the sub-unit, the program instructions executable by a processor to cause the system to perform:
   determining physical constraint data from parameter data of the feedthrough wire;
   determining timing constraint data related to the feedthrough wire from the physical constraint data;
   determining an expense of a net constraint of the feedthrough wire and utilizing a maximum net constraint supported by synthesis or the net constraint; and
   synthesizing the design data based on the timing constraint data.

* * * * *